(12) United States Patent
Aubin et al.

(10) Patent No.: US 12,086,230 B2
(45) Date of Patent: Sep. 10, 2024

(54) SECURE DIGITAL ENROLLMENT WITH A SMART CARD

(71) Applicant: IDEMIA France, Courbevoie (FR)

(72) Inventors: Yann-Loïc Aubin, Courbevoie (FR); Jean-François Deprun, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 232 days.

(21) Appl. No.: 17/895,100

(22) Filed: Aug. 25, 2022

(65) Prior Publication Data
US 2023/0069172 A1 Mar. 2, 2023

(30) Foreign Application Priority Data
Aug. 26, 2021 (FR) ........................................ 2108946

(51) Int. Cl.
*G06F 21/34* (2013.01)
*G06F 21/32* (2013.01)
(52) U.S. Cl.
CPC .............. *G06F 21/34* (2013.01); *G06F 21/32* (2013.01)
(58) Field of Classification Search
None
See application file for complete search history.

(56) References Cited

U.S. PATENT DOCUMENTS

| 2002/0035542 | A1* | 3/2002 | Tumey ................. G07F 7/1008 340/5.83 |
| 2015/0154437 | A1 | 6/2015 | Aoki |
| 2017/0337362 | A1 | 11/2017 | Arunachalam |
| 2018/0337907 | A1* | 11/2018 | Bhansali ................. H04L 63/08 |
| 2020/0050911 | A1 | 2/2020 | Prawitz |

FOREIGN PATENT DOCUMENTS

EP    1271436 B1    5/2007

OTHER PUBLICATIONS

Biggio Battista et al: "Adversarial Biometric Recognition : A review on biometric system security from the adversarial machine learning perspective", IEEE Signal Processing Magazine, IEEE, USA.

* cited by examiner

*Primary Examiner* — Cai Y Chen
(74) *Attorney, Agent, or Firm* — WOMBLE BOND DICKINSON (US) LLP

(57) ABSTRACT

A method carried out by a smart card including a fingerprint sensor, the method including an authentication phase including: acquiring a sequence of object prints from objects detected over time by the fingerprint sensor; comparing the sequence of object prints with reference data defining a reference sequence of object prints according to at least two different print types; and determining that the authentication phase is successful if the sequence of object prints coincides with the reference data. During a digital enrollment phase, the smart card generates, from at least one fingerprint, called enrollment fingerprint, digital enrollment data; and records these digital enrollment data so as to allow subsequent digital authentication from said digital enrollment data.

15 Claims, 6 Drawing Sheets

[Fig. 1]
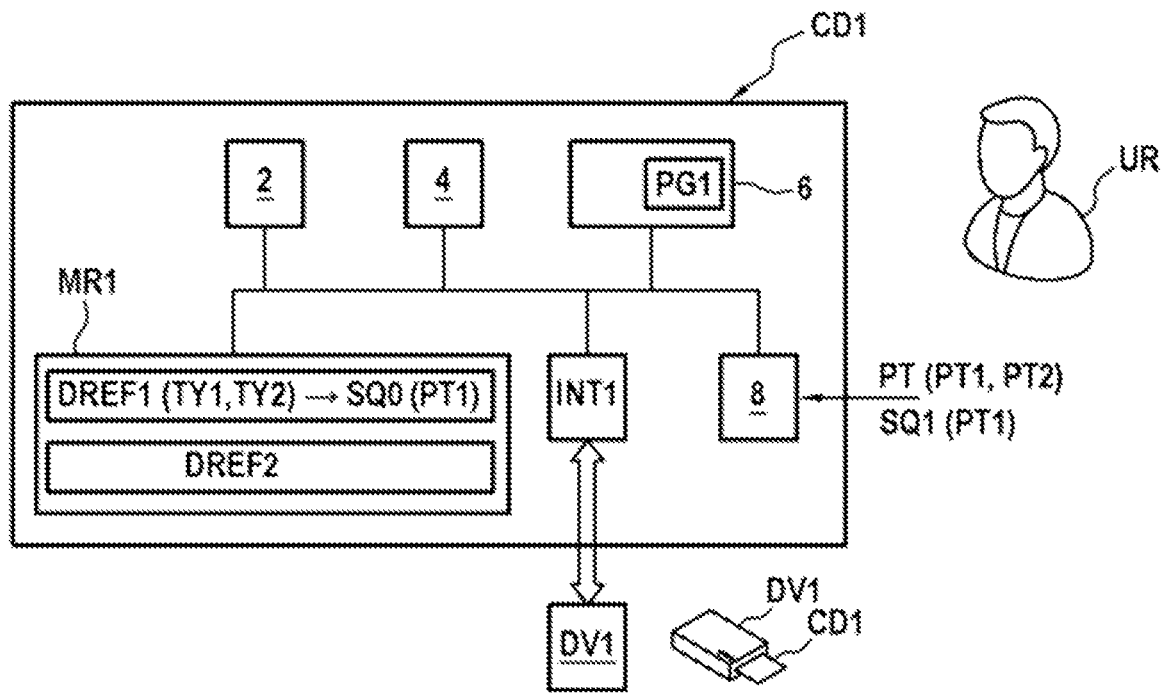
[Fig. 2]
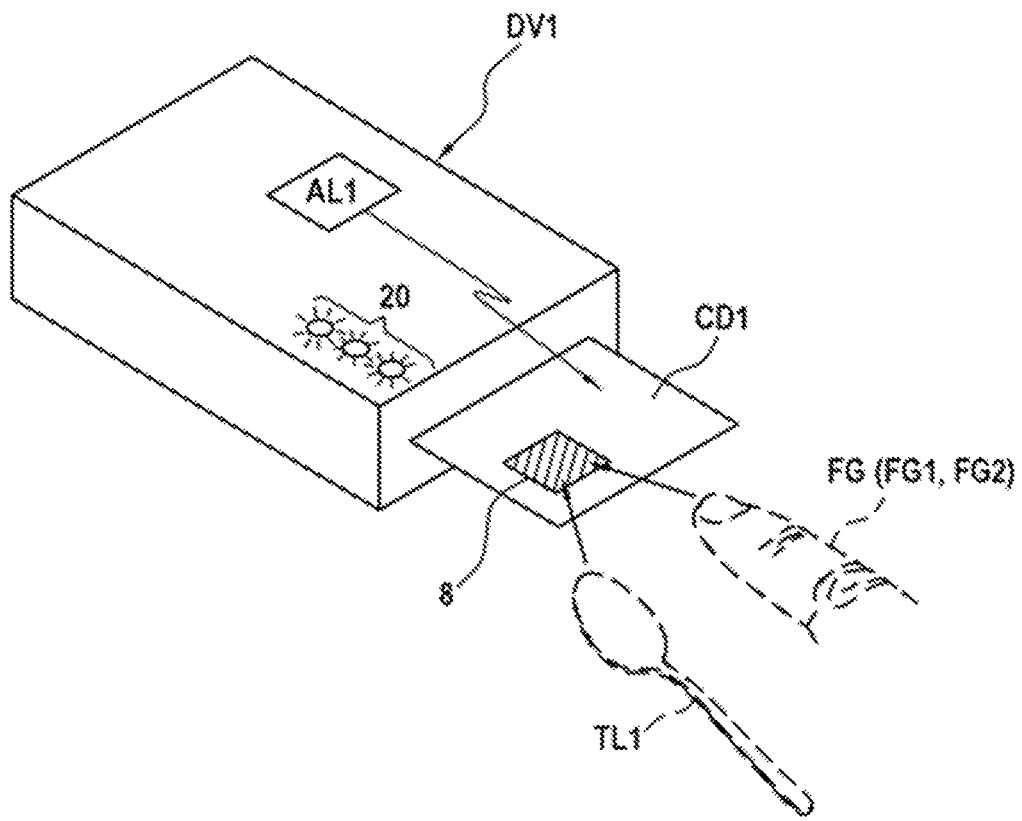

[Fig. 3]
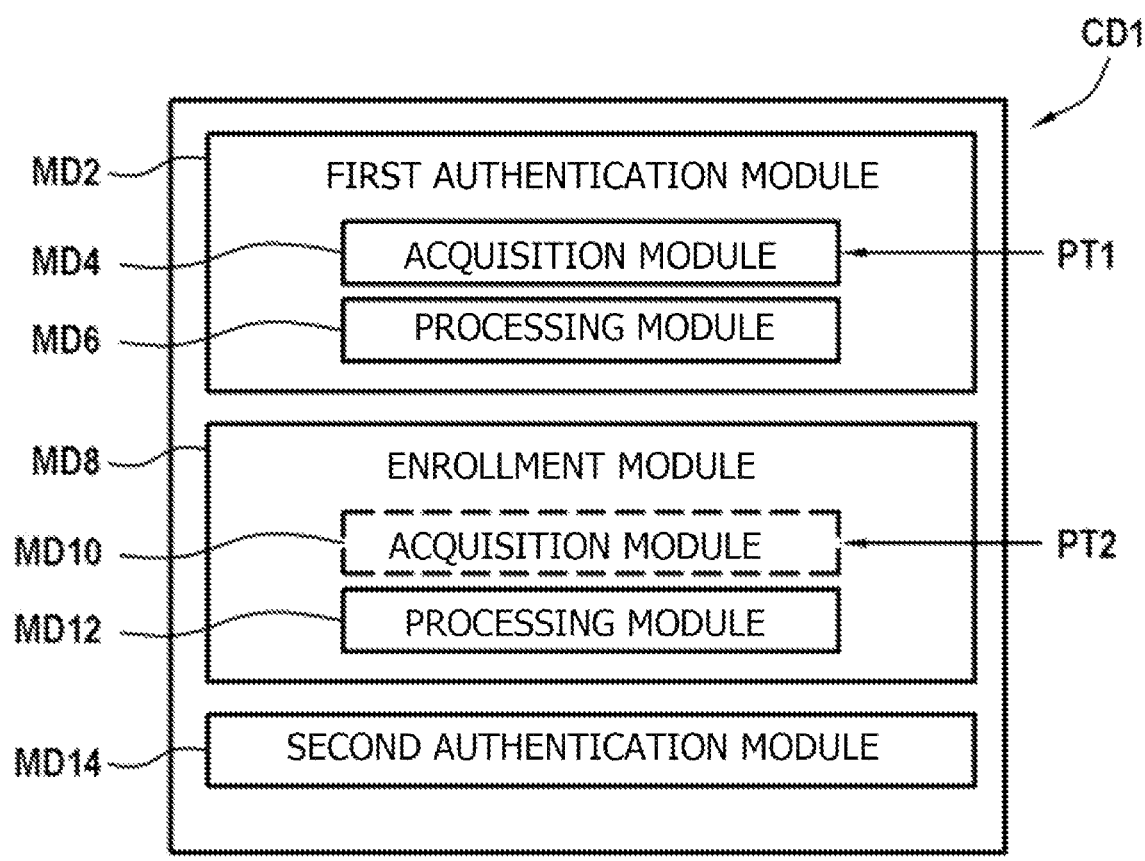

[Fig. 4A-4B]
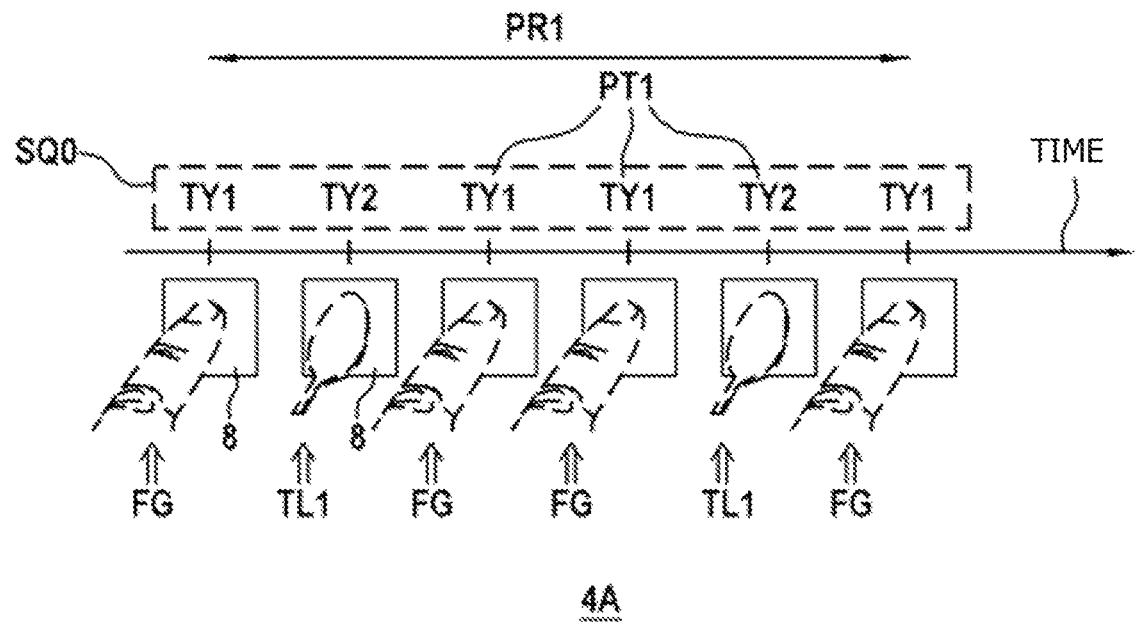
4A
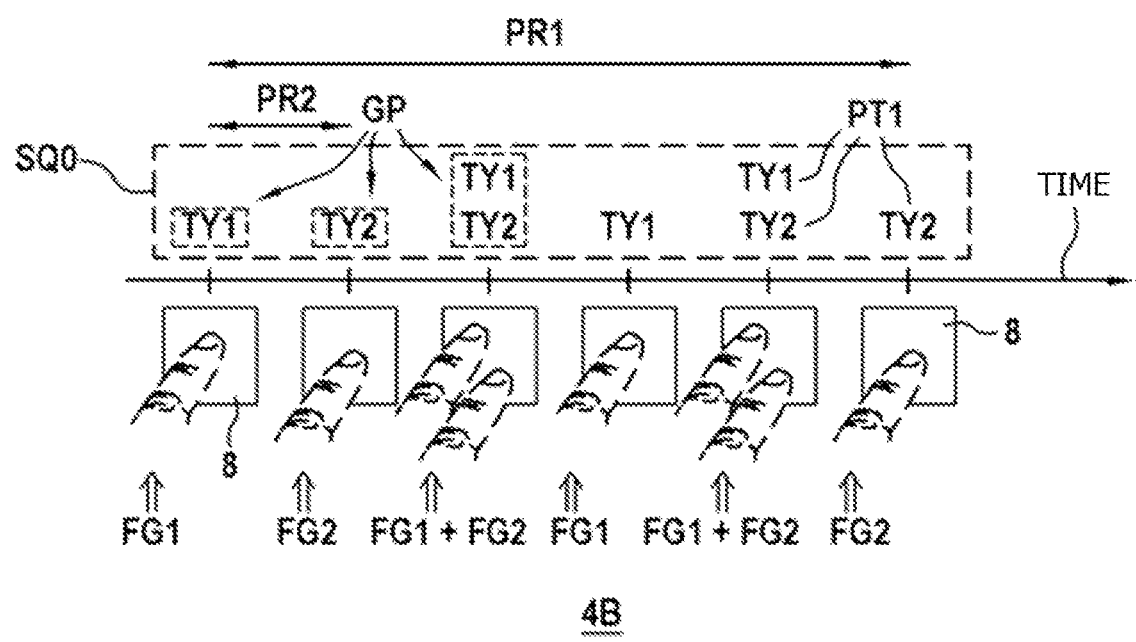
4B

[Fig. 5]
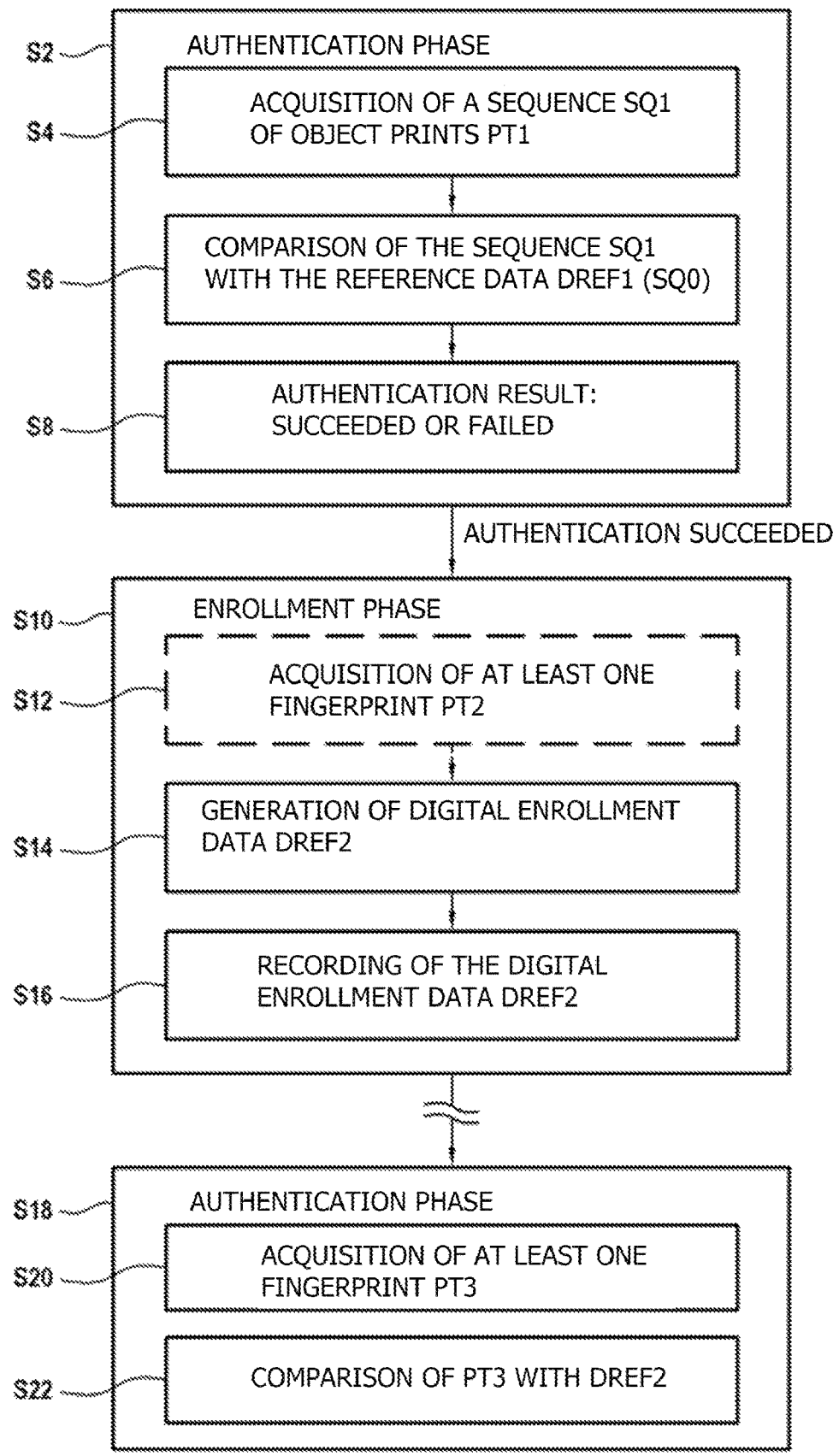

[Fig. 6]
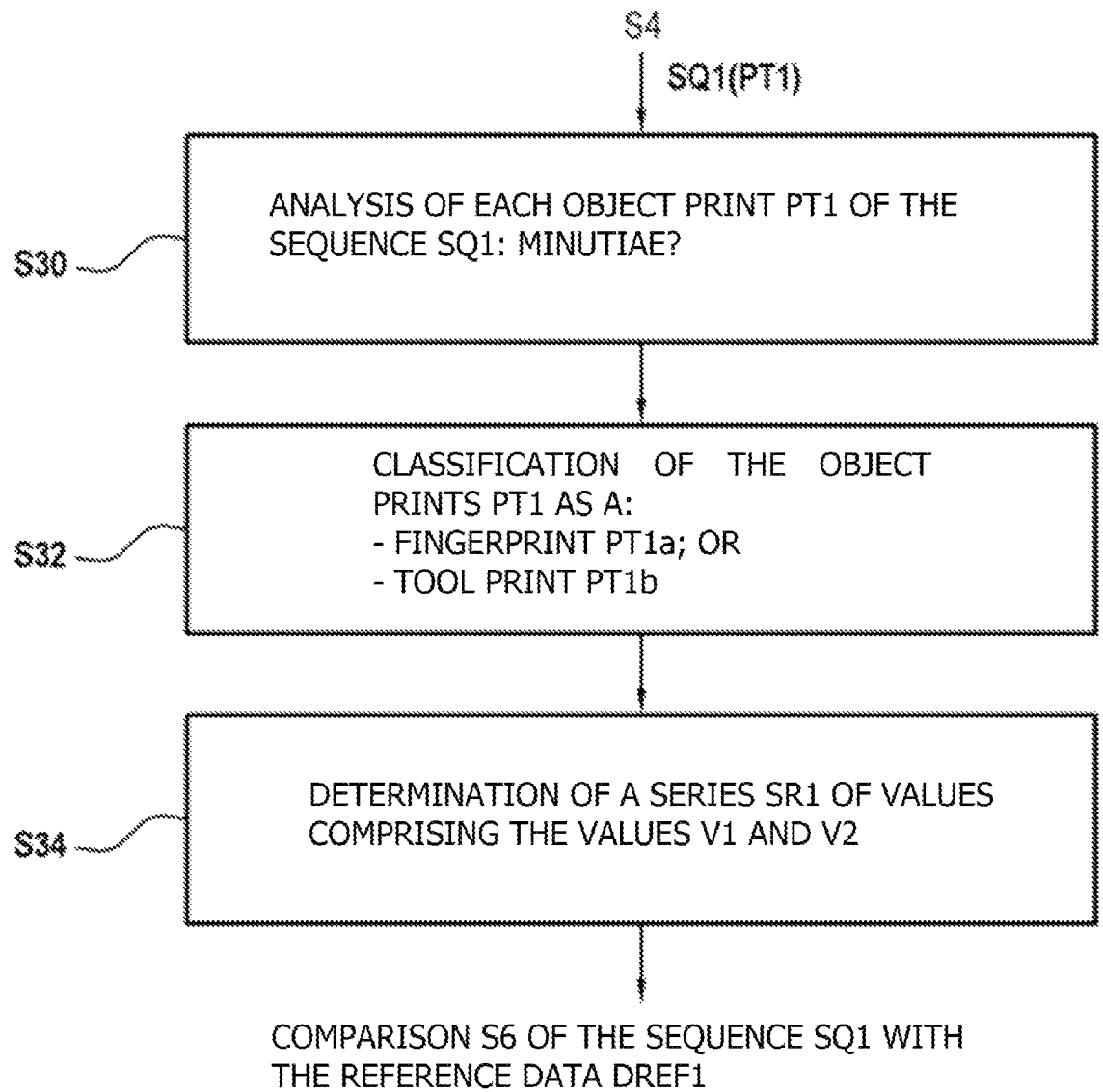

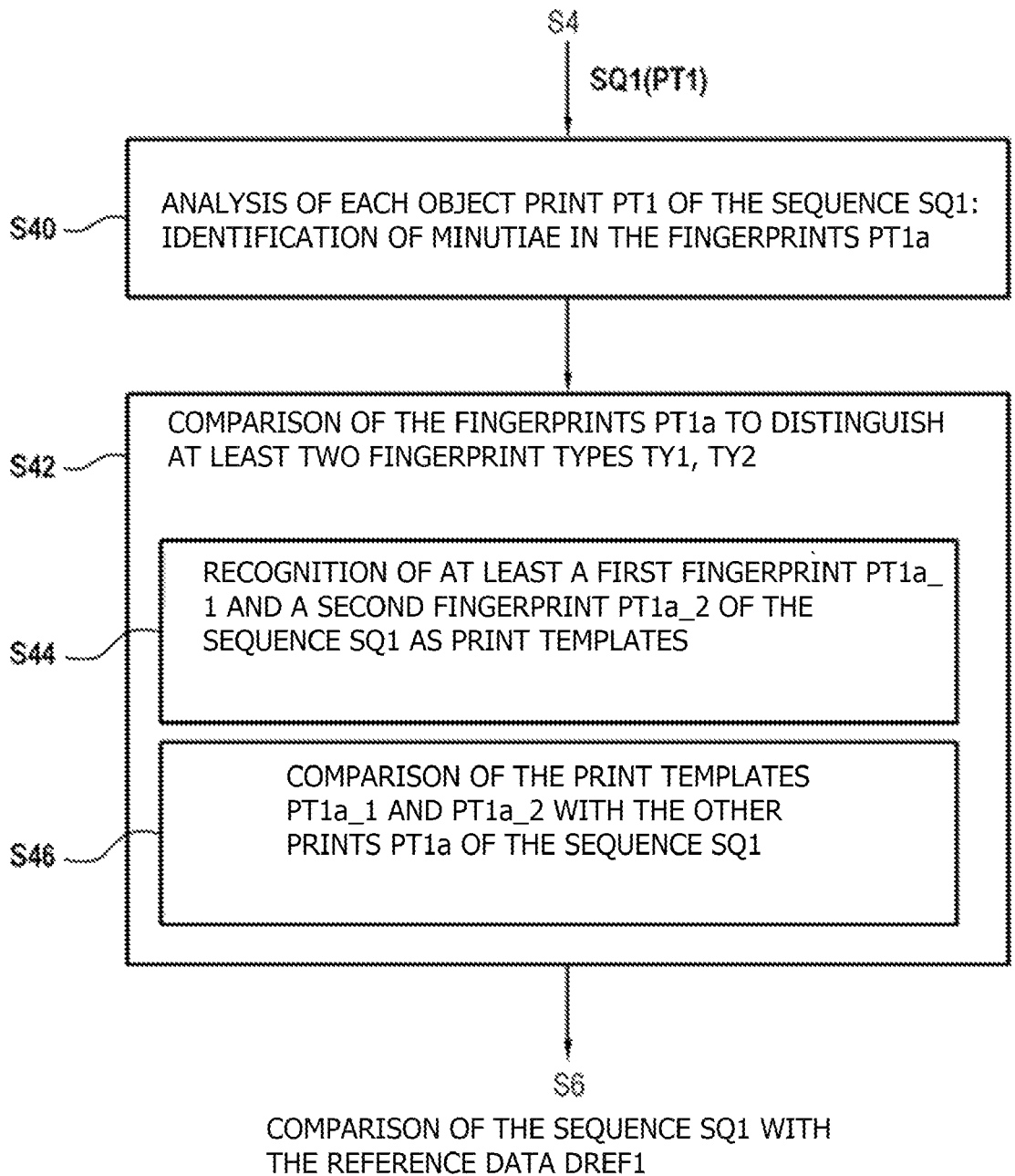

SECURE DIGITAL ENROLLMENT WITH A SMART CARD

TECHNICAL FIELD

The present disclosure relates to authentication by fingerprint, and more particularly concerns the securing of a digital enrollment with a smart card, to allow a subsequent digital authentication of a user.

BACKGROUND

Many improvements have been developed for smart cards in recent years. One of them includes equipping a smart card with a fingerprint sensor to authenticate a user, particularly to secure transactions performed by means of the smart card. Thus, according to the result of a fingerprint verification performed by means of its fingerprint sensor, such a smart card can accept or reject a transaction, which allows limiting the risks of fraudulent uses of the card.

In order to be able to perform digital authentication of a user, a smart card embedding a fingerprint sensor generally stores in memory reference digital data which are used to verify the validity of a fingerprint acquired during an authentication phase. Each user authentication phase is thus based on these reference digital data to which the smart card must access to determine whether the user being authenticated is an authorized user or not.

To do so, the smart card must perform an enrollment phase, prior to the authentication phases, during which the smart card records a fingerprint template as reference digital data. Insofar as it defines which user will be subsequently authorized to use the smart card, this enrollment phase is therefore particularly sensitive from a security point of view. This enrollment phase should be secured in order to ensure that the reference digital data are acquired and recorded in good conditions, so that only a legitimate user can be successfully authenticated by the smart card.

A known method includes configuring the smart card so that it authenticates the cardholder, during the enrollment phase, from a dedicated secret PIN code provided for this purpose by the issuer of the card. However, the use of such a secret code poses technical difficulties insofar as the smart cards traditionally include very limited resources, in particular in terms of means of interface between the user and the smart card. In general, a smart card is devoid of a user interface, or at least includes very limited user interface means, particularly with regard to the input means for inputting user instructions into the card.

Also, according to one particular technique, the holder of the smart card uses a particular application executed by a terminal cooperating with the card to enter the secret code in order to authenticate himself during the enrollment phase. However, the use of such a terminal also has technical difficulties insofar as this terminal must be secure and suitable for such an authentication phase. Particularly, this terminal must include a suitable user interface, in particular to allow the cardholder to securely enter the secret code at the user interface of the terminal. The use of such a terminal makes the enrollment phase more complex, presents risks in terms of security, and poses a problem when such a terminal is not available.

There is therefore a need for a solution that allows a secure digital enrollment with a smart card including a fingerprint sensor, including when the smart card has limited means in terms of user interface as is generally the case.

SUMMARY

To this end, the present disclosure relates to a processing method implemented by a smart card including a fingerprint sensor, the method including:
  a) an authentication phase including:
    a1) acquiring a sequence of object prints from objects detected over time by the fingerprint sensor;
    a2) comparing the acquired sequence of object prints with reference data prerecorded in the smart card, the reference data defining a reference sequence of object prints according to at least two different print types; and
    a3) determining that the authentication phase is successful if the sequence of object prints coincides with the reference data;
  b) a digital enrollment phase including:
    b1) generating, from at least one fingerprint, called enrollment fingerprint, digital enrollment data; and
    b2) recording the digital enrollment data so as to allow subsequent digital authentication from the digital enrollment data.

According to one particular embodiment, the method includes prior to the authentication phase:
  recording the reference data in a memory of the smart card.

According to one particular embodiment, the reference sequence to be followed during the acquisition phase includes at least two print groups acquired sequentially over time, each print group including at least one object print acquired simultaneously by the fingerprint sensor.

According to one particular embodiment, the method includes during the enrollment phase b):
  b0) acquiring, by the fingerprint sensor, as an enrollment fingerprint, at least one fingerprint independently of the acquisition a1) of the sequence of object prints.

According to one particular embodiment, at least one the enrollment fingerprint, from which the digital enrollment data are generated at b1), is a fingerprint acquired at a1) from among the sequence of object prints.

According to one particular embodiment, the recording b2) is performed before the determination a3), the digital enrollment phase further including, following the recording b2):
  b3) erasing the digital enrollment data in response to the determination at a3) that the authentication phase has failed.

According to one particular embodiment, the enrollment phase b) is triggered in response to the determination at a3) that the authentication phase is successful.

According to one particular embodiment, according to the reference sequence, an object print of a first print type is interposed in time between two object prints of another print type.

According to one particular embodiment, each object detected by the fingerprint sensor at a1) is a finger or a tool.

According to one particular embodiment, the authentication phase includes:
  analyzing each object print of the sequence of object prints acquired at a1) to determine whether the object print includes minutiae;
  identificating each object print of the acquired sequence of object prints, either as a tool print corresponding to a first print type or as a fingerprint corresponding to at least one other print type, depending on whether the object print includes minutiae;

in which, during the comparison a2), the acquired sequence of object prints including prints of the first and of the at least one other print type is compared with the reference sequence including prints of the first and the at least one other print type.

According to one particular embodiment, the authentication phase includes:

determining a series of values representative of the acquired sequence of object prints, in which each object print identified as a fingerprint is indicated in the series of values by an occurrence of a first value and each object print identified as a tool print is indicated in the series of values by an occurrence of a second value different from the first value; and wherein, during the comparison a2), the series of values representing the acquired sequence of object prints is compared with the reference data which define, as a reference sequence, a sequence of values including the first and second values.

According to one particular embodiment, the acquired sequence of object prints includes fingerprints, the authentication phase including:

analyzing each fingerprint of the sequence of object prints acquired at a1) to identify minutiae in the fingerprints of the acquired sequence of object prints;

comparing the fingerprints of the sequence of object prints acquired from the identified minutiae so as to identify at least two different fingerprint types corresponding to at least two different fingers;

wherein, during the comparison a2), the acquired sequence of object prints including the at least two different fingerprint types is compared with the reference sequence including fingerprints corresponding to at least two different fingers.

According to one particular embodiment, the authentication phase includes:

identifying a respective fingerprint of the acquired sequence of object prints, as a print template, for each among the at least two different fingerprint types if the fingerprint corresponds to a detected finger for the first time in the acquired sequence of object prints;

each print template being compared with the other fingerprints of the sequence of object prints so as to identify each the other fingerprint as one among the at least two different fingerprint types.

According to one particular embodiment, the authentication phase includes:

identifying at least a first fingerprint and a second fingerprint, among the sequence of object prints, as print templates of the at least two different fingerprint types according to a respective position of the at least a first and a second fingerprint in the acquired sequence of object prints at a1), the first and second fingerprints serving as print templates being compared with the other fingerprints of the sequence of object prints so as to identify each the other fingerprint as one among the at least two different fingerprint types corresponding to at least two different fingers.

According to one particular embodiment, the method includes a second authentication phase, subsequent to the authentication phase a), including:

c1) acquiring, by the fingerprint sensor, at least one new fingerprint;

c2) authenticating from a comparison of the at least one new fingerprint with the digital enrollment data.

In one particular embodiment, the different steps of the processing method of the disclosure are determined by computer program instructions.

Consequently, the disclosure also relates to a computer program on an information medium (or recording medium), this program being capable of being implemented in a device, such as a smart card for example, or more generally in a computer, this program including instructions adapted to the implementation of the steps of a processing method as defined above and as described below in particular embodiments.

Thus, the method of the disclosure can be implemented by means of a non-volatile memory storing computer program instructions and by means of a processor executing these instructions.

This program can use any programming language, and be in the form of source code, object code or intermediate code between source code and object code, such as in partially compiled form, or in any other desirable form.

The disclosure also relates to an information medium (or recording medium) readable by a computer, and more particularly by a smart card (and in particular by the processor of the smart card), and including instructions from a computer program as mentioned above.

The information medium can be any entity or device capable of storing the program. For example, the medium can include a storage means, such as a rewritable non-volatile memory or ROM, for example a CD ROM or a microelectronic circuit ROM, or even a magnetic recording means, for example a floppy disk or a hard drive.

On the other hand, the information medium can be a transmissible medium such as an electrical or optical signal, which can be conveyed via an electrical or optical cable, by radio or by other means. The program according to the disclosure can be particularly downloaded from an Internet-type network.

Alternatively, the information medium can be an integrated circuit in which the program is incorporated, the circuit being adapted to execute or to be used in the execution of the method in question.

The present disclosure also relates to a device, particularly a smart card, able to implement the processing method as defined in the present document. Particularly, the disclosure provides a smart card including:

a fingerprint sensor;

an authentication module configured to:

acquire a sequence of object prints from objects detected over time by the fingerprint sensor;

compare the acquired sequence of object prints with reference data prerecorded in the smart card, the reference data defining a reference sequence of at least two different print types; and determine that the authentication phase is successful if the sequence of object prints coincides with the reference data;

an enrollment module configured to:

generate, from at least one fingerprint, called enrollment fingerprint, digital enrollment data; and record digital enrollment data so as to allow subsequent digital authentication from the digital enrollment data.

It should be noted that the different embodiments mentioned above (as well as those described below) in relation to the processing method of the disclosure as well as the associated advantages apply analogously to the device (particularly to the smart card) of the disclosure.

For each step of the processing method, the device (particularly the smart card) of the disclosure can include a corresponding module configured to carry out the step.

According to one embodiment, the disclosure is implemented by means of software and/or hardware components. From this perspective, the term "module" may correspond in this document to a software component, a hardware component or a set of hardware and software components.

A software component corresponds to one or several computer program(s), one or several sub-program(s) of a program, or more generally any element of a program or software able to implement a function or a set of functions, as described below for the concerned module. Such a software component can be executed by a data processor of a physical entity (smart card, terminal, server, gateway, router, etc.) and is capable of accessing the hardware resources of this physical entity (memories, recording media, communication buses, electronic input/output cards, user interfaces, etc.).

In the same way, a hardware component corresponds to any element of a hardware assembly able to implement a function or a set of functions, according to what is described in this document for the concerned module. It can be a programmable hardware component or a hardware component with an integrated processor for the execution of software.

BRIEF DESCRIPTION OF THE DRAWINGS

Other characteristics and advantages of the present disclosure will become apparent from the description given below, with reference to the appended drawings which illustrate exemplary embodiments without any limitation. On the figures:

FIG. 1 schematically represents a smart card according to one embodiment of the disclosure;

FIG. 2 schematically represents a smart card cooperating with a peripheral device, according to at least one embodiment of the disclosure;

FIG. 3 schematically represents modules implemented by a smart card according to one particular embodiment of the disclosure;

FIGS. 4A-4B schematically represent reference sequences to be followed to authenticate a user, according to particular embodiments;

FIG. 5 schematically represents, in the form of a diagram, the steps of a processing method according to one embodiment of the disclosure;

FIG. 6 schematically represents, in the form of a diagram, the steps of a processing method according to one embodiment of the disclosure; and FIG. 7 schematically represents, in the form of a diagram, the steps of a processing method according to one embodiment of the disclosure.

DETAILED DESCRIPTION

As indicated above, it is advisable to secure a digital enrollment phase implemented by a smart card in order to avoid any fraudulent use of the card. To this end, the disclosure provides in particular the execution of a user authentication prior to a digital enrollment phase (or at least prior to the completion of this digital enrollment phase) of this user with a device such as a smart card for example.

However, as indicated above, a smart card by nature has relatively limited resources, in particular with regard to possible user interface means to allow a user to interact with the card. It is meant in this document by "user interface" any means allowing a user to interact with a device such as a smart card for example. A user interface can particularly include input interface means (keyboards, actuators, button, microphone, etc.) configured to allow a user to input instructions into the device in question, and/or output interface means (display screen, indicator lights, loudspeaker, etc.) configured to allow the device in question to output (restore, return, etc.) information to a user.

Particularly, a smart card generally includes little or no input interface means, which implies significant technical constraints and therefore poses a problem to reliably and securely authenticate a user of the smart card. The disclosure therefore proposes, according to various embodiments, to use a smart card (or more generally a device) equipped with a fingerprint sensor to authenticate a user prior to a digital enrollment phase (or at least before completion of this digital enrollment phase).

However, the use of a digital sensor to authenticate a user with a smart card, and this prior to the phase of digital enrollment of this user (or at least prior to the completion of this digital enrollment phase), presents a technical difficulty insofar as, by definition, the smart card does not have a reference fingerprint in memory to verify whether one or several fingerprint(s) captured by its fingerprint sensor are valid.

The disclosure therefore proposes to solve these technical difficulties in particular by comparing a sequence of object prints acquired over time by the fingerprint sensor prior to a digital enrollment phase (or at least before completion of this digital enrollment phase), with reference data accessible by the smart card (these reference data being for example pre-recorded in the card). More particularly, the disclosure provides in particular, according to some embodiments, a processing method implemented by a smart card including a fingerprint sensor, this method including an authentication phase from a sequence of object prints acquired by the fingerprint sensor of the card (this authentication phase involving a comparison of this acquired sequence with reference data), then the triggering of a digital enrollment phase on detection that the authentication phase has passed successfully.

As described below, the fingerprint sensor of a smart card of the disclosure can be used to acquire fingerprints of various objects, whether fingers (or any other anatomical part) or tools. Thus, such a sensor can allow the acquisition of various types of object prints, including fingerprints and tool prints (print produced by any tool other than a finger).

Although a smart card does not normally have in its memory a reference fingerprint of a legitimate user before the actual execution of a digital enrollment phase (whose aim is by nature to obtain one or several reference print(s)), the smart card of the disclosure is capable of recognizing a sequence of several object prints detected over time by the fingerprint sensor and comparing this acquired sequence with a reference sequence in such a way to determine whether an authentication phase is successful or has failed, and this before the digital enrollment phase (or at least before completion of this enrollment phase). The use of fingerprint sequences allows authenticating a user by means of the fingerprint sensor of the smart card even though the digital enrollment phase has not yet been performed.

Other aspects and advantages of the present disclosure will emerge from the exemplary embodiments described below with reference to the drawings mentioned above.

In the embodiments described below, the disclosure is implemented by a smart card, for example a bank card or payment card, an access badge, an identity card, a voting card, etc. The disclosure can however generally be applied to devices other than smart cards, able to process transactions (for example payment transactions) by cooperating with an external terminal.

It should also be noted that the notion of transaction is understood in this document in the broad sense and includes for example, in the banking field, various banking transactions, in particular payment transactions, transfer transactions, etc. The disclosure applies in particular, but not exclusively, to payment cards intended to perform banking transactions. It will be understood that other types of transactions or operations can be envisaged within the framework of the disclosure (electronic voting, transaction to access sensitive data, transaction to obtain physical or logical access, etc.).

Unless otherwise indicated, the elements common or similar to several figures bear the same reference signs and have identical or similar characteristics, so that these common elements are generally not described again for the sake of simplicity.

Unless otherwise indicated, the terms "first", "second", etc. are used in this document by arbitrary convention to allow identifying and distinguishing different elements (such as keys, devices, etc.) implemented in the embodiments described below.

FIG. 1 represents the structure of a smart card CD1 according to one particular embodiment of the disclosure. In this example, the smart card CD1 includes a fingerprint sensor 8 and is configured to perform an authentication of a user UR by means of the sensor 8 before the digital enrollment of the user UR with the card (or at least before the completion of this digital enrollment of the user UR with the card).

The smart card CD1 can be for example a bank card or a payment card, for example an EMV (Europay Mastercard Visa) type card, although other protocols are possible.

In this particular example, the smart card CD1 is configured to cooperate with a peripheral device DV1, although other examples are possible without the intervention of such a peripheral device.

More specifically, the smart card CD1 includes in this example a processor 2, a volatile memory 4 (RAM), a non-volatile memory 6, a rewritable non-volatile memory MR1, the fingerprint sensor 8, and possibly a communication interface INT1.

It is assumed for example that the smart card does not include any user interface (or at least any user interface means in input) apart from the fingerprint sensor 8. Variants are however possible in which the smart card CD1 further includes a user interface in addition to the fingerprint sensor 8, including for example at least one among one or several indicator light(s), a screen, one or several button(s), etc.

It is also assumed in this example that the smart card CD1 is devoid of internal power supply source. In this example, the smart card CD1 is configured to be electrically powered by the peripheral device DV1 when the card CD1 and the peripheral device DV1 are coupled together (as described below).

The memory 6 is a rewritable non-volatile memory or a read only memory (ROM), this memory constituting a recording medium (or information medium) in accordance with one particular embodiment, readable by the smart card CD1, and on which a computer program PG1 in accordance with one particular embodiment is recorded. This computer program PG1 includes instructions for the execution of the steps of a processing method according to particular embodiments, as described in more detail later.

The rewritable non-volatile memory MR1 (for example of Flash type) is able to store in particular first reference data DREF1 and second reference data DREF2. As described below, the first reference data DREF1 are pre-recorded in the smart card CD1 and are used by the smart card CD1 during an authentication phase prior to (or parallel to, or concomitant with) a digital enrollment phase to authenticate a user UR from a sequence of object prints PT acquired by the fingerprint sensor 8. These first reference data DREF1 can define for example a reference sequence of at least two types of different prints denoted TY1 and TY2 (FIG. 1). The second reference data DREF2 are digital enrollment data which can be generated by the smart card CD1 during an enrollment phase subsequent to the aforementioned authentication phase. The nature and use of the reference data DREF1 and DREF2 will appear more specifically in the following specific examples.

The fingerprint sensor 8 is configured to acquire (capture) fingerprints, and more generally object prints PT. These can in particular be object prints PT1 acquired during an authentication phase prior to (or parallel to, or concomitant with) a digital enrollment phase or object prints PT2 acquired during a digital enrollment phase subsequently to the authentication phase. As described below, the fingerprint sensor 8 can be particularly used to acquire a sequence SQ1 of object prints PT1 during an authentication phase prior to (or parallel to, or concomitant with) a digital enrolment phase.

Various objects can be presented in contact with or in the vicinity of the sensor 8 in order to allow the latter to acquire a corresponding print. As already indicated, the nature of the considered objects can vary depending on the case. By definition, the fingerprint sensor 8 is configured to acquire at least fingerprints produced from fingers. According to some exemplary embodiments, the fingerprint sensor 8 can further be configured to acquire object prints other than fingerprints, in particular tool prints produced from tools other than fingers (or other than anatomical parts). The fingerprint sensor 8 can for example be configured to acquire prints—called tool prints—of one or several tool(s) of various kinds, such as spoons, styluses or any other suitable tool that can be manipulated by a user UR to interact with the fingerprint sensor 8.

The fingerprint sensor 8 can be particularly configured to determine whether an acquired object print PT1 constitutes a fingerprint or a tool print according to the identification or not of minutiae in the print. According to one specific example, the presence of minutiae in a print indicates that it is a fingerprint and, conversely, the absence of minutiae indicates that it is a tool print.

In the present document, minutiae are particular elements (local singular points, points of irregularities, etc.) characterizing the surface of a finger, for example characteristics of papillary lines (terminations, bifurcations, islands, etc.). The nature and number of minutiae considered for a given finger may vary depending on the case.

In general, the fingerprint sensor 8 can be configured for example to acquire at least two different types—denoted TY1 and TY2—of object prints. Each of these types TY1 and TY2 can correspond for example to any fingerprint (that is to say a fingerprint characterizing any finger), to a given fingerprint (characterized by predefined minutiae of a given finger), a print of any tool other than a finger (devoid of minutiae characterizing the surface of a finger), of a particular tool (presenting predefined characteristics), etc.

Exemplary implementations illustrating the diversity of print types that can be detected by the fingerprint sensor 8 and used during the processing method are described later.

The way in which the fingerprint sensor 8 performs the acquisition of an object print from a corresponding object can vary according to the technology used by the considered sensor. The specificities of the sensor 8 used can thus vary according to the implementation choices of those skilled in the art. The fingerprint sensor 8 can in particular be a capacitive sensor, an optical sensor, a thermal sensor, etc. and more generally any sensor able to acquire object prints, including fingerprints.

In the case where the fingerprint sensor 8 is configured to acquire tool prints from a tool (other than a finger), the nature of this tool may vary according to the technology of the sensor. Particularly, the sensor 8 can be configured to acquire tool prints produced by electrically conductive tools, or possibly by non-electrically conductive tools depending on the case.

As described later, the fingerprint sensor 8 can in some examples be configured to simultaneously acquire a plurality of object prints PT. To do so, a user can then present in the detection area of the sensor 8 (in contact with or in the vicinity of the sensor 8) several objects (fingers and/or tools) simultaneously, each of these objects causing the acquisition of multiple prints.

In this example, the processor 2 uses the volatile memory 4 to carry out the different operations and functions necessary for the operation of the smart card CD1, including to execute the computer program PG1 during the implementation of the processing method of the disclosure.

The smart card CD1 can be configured to perform a given function by cooperating with an external terminal (not represented), for example to perform a transaction, such as a banking transaction (payment transaction, etc.) or any other type of transaction. The smart card CD1 can in particular be an EMV smart card configured to perform EMV transactions.

According to one particular example represented in FIG. 2, the peripheral device DV1 with which the smart card CD1 can be coupled is a case into which the card CD1 can be inserted or engaged. Other forms of the peripheral device DV1 are however possible. The case DV1 includes in this example an internal power source AL1 adapted to electrically power the smart card CD1 when the two elements are coupled together. In this example, the coupling is therefore performed by contact, although other implementations are possible such as a contactless coupling so that the power supply is provided contactlessly (for example by induction) from the peripheral device DV1 to the smart card CD1.

The peripheral device DV1 may optionally also include a user interface 20 to guide the user during the execution of the processing method by the smart card CD1. This user interface 20 can be relatively limited and include for example one or several indicator light(s), other implementations being possible without the peripheral device DV1 having such a user interface 20.

As represented in FIG. 2, the smart card CD1 electrically powered by the peripheral device DV1 (by the power source AL1) is configured to acquire object prints PT by means of its fingerprint sensor 8. As already indicated, the nature of the objects whose prints are acquired may vary depending on the case. In this example, the sensor 8 allows for example capturing fingerprints PT corresponding to fingers FG (for example prints correspond to at least two different fingers denoted FG1 and FG2) and possibly object prints PT corresponding to one or several tool(s), such as the tool TL1 (a spoon in this example).

Variants are however possible in which the smart card CD1 includes an internal power source allowing it to be electrically self-powered, so that the use of a peripheral device DV1 is not necessary.

It will be understood that some elements generally present in a smart card have been deliberately omitted because they are not necessary for the understanding of the present disclosure. Furthermore, it is important to note that the smart card CD1 only constitutes one non-limiting exemplary embodiment of the disclosure. Those skilled in the art understand particularly that some elements of the smart card CD1 are only described here to facilitate understanding of the disclosure, variants being possible without these elements.

FIG. 3 represents, according to one particular embodiment, modules implemented by the processor 2 when the latter executes the computer program PG1, namely the following modules: a first authentication module MD2, an enrollment module MD8 and optionally a second authentication module MD14.

More specifically, the first authentication module MD2 is configured to perform an authentication phase. As described below, this authentication phase can be triggered before, or in parallel with, an enrollment phase. To do so, the first authentication module MD2 can include in this example a first acquisition module MD4 and a first processing module MD6.

The first acquisition module MD4 is configured to acquire a sequence SQ1 of object prints PT1 from objects detected over time by the fingerprint sensor 8 of the smart card CD1. The notion of sequence of object prints is described in more detail later.

The first processing module MD6 is configured to compare the sequence SQ1 of object prints PT1 acquired by the first acquisition module MD4, with reference data DREF1 prerecorded in the smart card CD1. As already indicated, these reference data DREF1 can for example define a reference sequence SQ0 of reference prints according to at least two different print types denoted TY1, TY2. The first processing module MD6 is further configured to determine that the authentication phase is successful if the sequence SQ1 of object prints PT1 coincides with (or conforms to) the reference data DREF1.

The enrollment module MD8 is further configured to perform a digital enrollment phase, the latter possibly being subsequent to the authentication phase performed by the first authentication module MD2 or possibly performed in parallel with (concomitantly with) the authentication phase. To do so, the enrollment module MD8 can include in this example a second processing module MD12, and also possibly a second acquisition module MD10.

The second processing module MD12 is configured to generate, from at least one enrollment fingerprint PT2, digital enrollment data DREF2, that is to say data serving as a template of the fingerprint of a user authorized to use the smart card CD1.

By definition, a fingerprint within the meaning of this document corresponds to the print of a finger (and not of a tool), which is or must be detected by the fingerprint sensor 8.

The second processing module MD12 can further be configured to record the digital enrollment data DREF2, for example in the memory MR1 of the smart card CD1, so as to allow subsequent digital authentication by the smart card CD1 from the digital enrollment data DREF2.

As described below, the enrollment fingerprint(s) PT2 used by the second processing module MD12 to generate the digital enrollment data DREF2 can include at least one fingerprint acquired by the enrollment module MD8 independently of the authentication phase performed by the first authentication module MD2. To do so, the enrollment module MD8 can further include the second acquisition module MD10 mentioned above, the latter being configured to acquire, by using the fingerprint sensor 8, at least one fingerprint PT2 as an enrollment fingerprint.

According to one particular example, the second authentication module MD14 is further configured to perform digital authentication of a user by comparing at least one fingerprint acquired by the fingerprint sensor 8 (after the authentication phase performed by the first authentication module MD2) with the digital enrollment data DREF2, which can be consulted in this example by the smart card CD1 in its memory MR1.

As indicated above, the smart card CD1 is configured to authenticate a user UR (FIG. 1), before (or possibly in parallel with) the execution of a phase of digital enrollment of this user UR, from a sequence SQ1 of object prints PT1 acquired by the fingerprint sensor 8. For this authentication phase to pass successfully, this sequence SQ1 must coincide (match) with the reference sequence SQ0 defined by the reference data DREF1 prerecorded in the smart card CD1.

In general, the reference sequence SQ0 defined by the reference data DREF1 is composed of a plurality of object fingerprints PT1 to be made over time according to a predefined order, a respective print type (namely TY1 or TY2 in the following examples) being assigned to each of the object prints of the reference sequence SQ0. In other words, according to the reference data DREF1, each object print of the reference sequence SQ0 is of a respective print type. This reference sequence SQ0 implies that all the object prints PT1 which compose it are not acquired simultaneously but, on the contrary, that this sequence includes at least two object prints PT1 acquired one after the other over time in a predefined order.

The nature of the reference sequence SQ0 that it is necessary for a user UR to perform with the fingerprint sensor 8 to authenticate himself can vary depending on the case, some exemplary implementations being described below. Particularly, the type of the object prints PT1 (particularly the nature of these types and the number of different types) or the arrangement over time of the object prints PT1 in the reference sequence SQ0 can vary according to the desired implementation.

FIG. 4A represents according to one particular example a reference sequence SQ0 that must be followed by the sequence SQ1 of object fingerprints PT1 performed by a user UR during a time period PR1 during an authentication phase prior to an enrollment phase (or at least prior to the completion of this enrollment phase), this sequence SQ0 including object prints PT1 according to two different print types TY1 and TY2. It is assumed here for example that the first print type TY1 corresponds to any fingerprint FG (corresponding to any finger) while the second print type TY2 corresponds to any tool TL1 (devoid of minutiae characterizing the surface of an object). By way of example, this reference sequence SQ0 is composed of object prints PT1 according respectively to the following types over time: TY1-TY2-TY1-TY1-TY2-TY1. In this example, the object prints PT1 must be detected successively, one after the other, during the time period PR1. Thus, to authenticate himself successfully, a user UR must for example present any finger, then a tool without minutiae, then twice successively any finger, then a tool without minutiae, then again any finger.

It should be noted that at the stage of the authentication phase prior to the digital enrollment phase (or at least prior to the completion of the digital enrollment phase), the smart card CD1 does not have in memory a template of the fingerprints of the cardholder but is for example capable of recognizing whether an object print PT1 corresponds to a finger (first type TY1) or to a tool (second type TY2), depending for example on the detection or not of minutiae in each acquired print.

In some embodiments, the reference sequence SQ0 to be followed during an authentication phase prior to (or parallel to) an enrollment phase includes at least two print groups GP acquired sequentially over a time period PR1, each print group GP including at least one object print PT1 acquired simultaneously by the fingerprint sensor 8.

FIG. 4B represents, according to one particular example, a reference sequence SQ0 that must be followed by the sequence SQ1 of object prints PT1 performed by a user UR during a time period PR1 during an authentication phase prior to an enrollment phase (or at least prior to the completion of this enrollment phase), this sequence SQ0 including object prints PT1 according to two different print types TY1 and TY2. It is assumed in this example that the first print type TY1 corresponds to a fingerprint corresponding to any first finger (that is to say a fingerprint characterized by first minutiae of any first finger) and that the second print type TY2 corresponds to a fingerprint corresponding to any second finger different from the first finger (that is to say a fingerprint characterized by second minutiae of any second finger). In this case, the use of a tool TL1 is not necessary to allow the user UR to authenticate himself by means of the fingerprint sensor 8, although variants are possible in which the reference sequence SQ0 includes fingerprints according to at least two different print types (called first and second print types) as well as at least one tool print according to a third print type.

As described in more detail later, the reference sequence SQ0 as represented in FIG. 4B does not define which particular fingers (or which minutiae) must be detected to authenticate a user UR, but more generally defines a given alternation of fingerprint types corresponding to several distinct fingers, these fingers possibly being arbitrary insofar as the alternation of print types as defined by the reference sequence SQ0 is followed.

Still in the example of FIG. 4B, the reference sequence SQ0 to be followed during the authentication phase, prior to (or in parallel with, or concomitant with) the enrollment phase, can include print groups GP acquired sequentially by the fingerprint sensor 8 during a time period PR1, each print group GP including either a fingerprint according to a print type among TY1 and TY2, or two prints according to the print types TY1 and TY2 which are detected simultaneously. Alternatively, the groups GP can include more than two fingerprints acquired simultaneously by the fingerprint sensor 8. To do so, the fingerprint sensor 8 can be configured to allow the simultaneous capture of two fingerprints (or more) by positioning two (or more) fingers side by side on (or in the detection area of) the fingerprint sensor 8.

By way of example, the reference sequence SQ0 illustrated in FIG. 4B is composed of object prints PT1 of the following types over time: TY1-TY2-[TY1, TY2]-TY1-[TY1, TY2]-TY2, where the mention [TY1, TY2] indicates that the fingerprint sensor 8 simultaneously captures a first object print PT1 according to the first type TY1 and a second object print PT1 according to the second type TY2. Thus, to authenticate himself successfully, a user UR must for example present any first finger FG1, then any second finger FG2 (different from the first finger), then the first and second fingers FG1, FG2 simultaneously, then the first finger FG1, then again the first and second fingers FG1, FG2 simultaneously, then the second finger FG2.

As already indicated, at the stage of the authentication phase performed prior to (or in parallel with, or concomitantly with) the digital enrollment phase, the smart card CD1 does not have in memory a template of the fingerprints of the cardholder but can for example be configured to recognize whether each object print PT1 acquired as part of the sequence SQ1 is a fingerprint or a tool print depending on whether or not there are minutiae in the print, or can be configured to recognize that several acquired fingerprints PT1 correspond to the same finger (depending on the minutiae characterizing these prints). The smart card can thus detect an alternation of print types defined by the sequence SQ1 of object prints PT1.

The user UR of the smart card CD1 (FIG. 1) can thus make various combinations of object prints (with one or several finger(s) and/or with one or several tool(s)) according to a sequence SQ1 of prints over time so as to authenticate himself with the smart card CD1, and this without the smart card CD1 having at this stage in its memory templates of the fingerprints of the cardholder. Exemplary embodiments of the processing method of the disclosure are now described below, allowing the smart card CD1 to authenticate a user UR, before the digital enrollment of this user UR (or at least before completion of the finger enrollment of this user UR), by using his fingerprint sensor 8.

One embodiment of the disclosure is described below with reference to FIG. 5. More specifically, the smart card CD1 as previously described with reference to FIGS. 1-4 implements the processing method of the disclosure according to one particular example by executing the program PG1.

It is assumed that a user UR wishes to personalize the smart card CD1 by performing a digital enrollment with this card in order to store therein one or several fingerprint template(s) which will serve as reference data to subsequently authenticate this user UR. To do so, the smart card CD1 is coupled in this example with the peripheral device DV1 so that the latter electrically powers the smart card CD1, although other examples without such a peripheral device DV1 are possible.

It is considered firstly that the smart card CD1 is in an initial state in which the card includes in memory the reference data DREF1 but has not yet performed the user UR enrollment phase. In other words, the smart card CD1 does not have in its memory a template of the fingerprint of the user UR. The smart card CD1 thus executes the processing method according to one particular example to securely enroll at least one fingerprint of the user UR.

As represented in FIG. 5, during an authentication phase S2 (prior to a digital enrollment phase S10, or at least upon completion of this digital enrollment phase S10), the smart card CD1 verifies the authenticity of the user UR from object prints PT1 acquired by his fingerprint sensor 8. To do so, the authentication phase S2 includes the steps S4, S6 and S8 described below.

During an acquisition step S4, the smart card CD1 acquires a sequence SQ1 of object prints PT1 from objects detected over time by the fingerprint sensor 8. By way of example, it is considered that the acquisition S4 of the sequence SQ1 takes place over a time period PR1, which may vary depending on the case and be suitable for those skilled in the art.

As already described, the types of the object prints PT1 acquired at S4 in the sequence SQ1 can vary depending on the case and depend particularly on the nature of the object used to generate each print. The user UR can in particular present successively, one after the other or in groups of two or more, objects (one or several finger(s) and/or one or several tool(s)) in the detection area of the fingerprint sensor 8. To do so, it is assumed by way of example that the user UR places each object in contact with the fingerprint sensor 8, although variants are possible where object prints are acquired without a contact of the objects with the sensor 8 being necessary.

As described in particular with reference to FIGS. 4A-4B, the sequence SQ1 can include a plurality of different types of object prints (for example at least two different types). Furthermore, the sequence SQ1 can be broken down into several successive acquisition steps, so that one or several object print(s) is/are acquired by the fingerprint sensor 8 at each of these acquisition steps. In the case of a multiple acquisition of prints, all the prints are acquired simultaneously during the considered acquisition step. According to one particular example, the sequence SQ1 of object prints acquired at S4 thus includes at least two print groups acquired sequentially over time (during successive acquisition steps), each print group including at least one object print acquired simultaneously by the fingerprint sensor 8.

During a comparison step S6, the smart card CD1 compares the sequence SQ1 of object prints PT1 acquired at S4 with the reference data DREF1. In this example, the reference data DREF1 are prerecorded in the smart card CD1. To do so, the method can comprise, before the authentication phase S2 (or at least before the comparison step S6), a preliminary step (not represented) of recording the reference data DREF1, namely in the memory MR1 of the smart card CD1 in this example.

During an analysis step S8, the smart card CD1 determines that the authentication phase S2 has passed successfully if the print sequence SQ1 coincides (matches) with the reference sequence SQ0 defined by the reference data DREF1. In other words, the user UR is authenticated successfully if the print sequence SQ1 matches the reference data DREF1. If, on the other hand, the sequence SQ1 does not match the reference sequence SQ0, the authentication phase S2 is considered to have failed.

It is considered for example that the reference data DREF1 define a reference sequence SQ0 of object prints according to at least two different print types of TY1, TY2. In other words, the reference sequence SQ0 forms a series of object prints including object prints of at least two different types TY1, TY2. It is assumed for simplicity that the reference sequence SQ0 here only includes these two different types TY1, TY2, although other implementations are possible with more than two different print types.

During the authentication phase S2, the smart card CD1 does not yet have in memory a fingerprint template serving as reference data to authenticate the cardholder. As described above, the reference data DREF1 define a reference sequence SQ0 formed of a plurality of object prints PT1 to be made over time according to a predefined order, a respective print type (namely TY1 or TY2 in this example) being assigned to each of the object prints of the reference sequence SQ0. Also, during the comparison step S6, the smart card CD1 does not know the real fingerprints of the cardholder but verifies that the sequence SQ1 of object prints acquired at S4 follows an alternation (or variation) of print types as defined in the reference sequence SQ0.

According to one particular example, during the comparison step S6, the smart card CD1 verifies that:
- the sequences SQ0 and SQ1 include the same number of object prints PT1; and
- the object prints PT1 composing the acquired sequence SQ1 follows the print type alternation as defined by the reference sequence SQ0.

If these verifications have passed successfully, the smart card CD1 detects at S8 that the authentication phase S2 is successful.

According for example to the case represented in FIG. 4A, the reference sequence SQ0 defines object prints according to two print types TY1, TY2 corresponding respectively to any fingerprint and to any tool print. In this case, the smart card CD1 verifies at S6 that the acquired sequence SQ1 includes 6 successive object prints PT1 and that these prints correspond successively to any fingerprint FG, any tool print TL1, twice successively any fingerprint FG, any tool print TL1 and any fingerprint FG (FG-TL1-FG-FG-TL1-FG). To do so, the smart card CD1 can temporarily record (for example in its RAM 4) the object prints PT1 acquired at S4 so as to be able to determine their types and verify that they follow the reference sequence SQ0. As described below, the smart card CD1 can verify for each acquired object print PT1 whether it includes minutiae characterizing a fingerprint and, if so, determine that the print constitutes a fingerprint (otherwise it is a tool print).

According for example to the case represented in FIG. 4B, the reference sequence SQ0 defines object prints according to two print types TY1, TY2 corresponding respectively to fingerprints corresponding to a first given finger and to a second given finger different from the first finger. In this case, the smart card CD1 verifies at S6 that the acquired sequence SQ1 includes 6 successive groups of at least one fingerprint in accordance with the reference sequence SQ0 illustrated in FIG. 4B. To do so, the smart card CD1 can temporarily record (for example in its RAM 4) the object prints PT1 acquired at S4 so as to verify that these prints PT1 are fingerprints and recognize the fingerprints corresponding to the same finger and therefore belonging to the same type in the sequence SQ1 (TY1 or TY2 in this example). As described below, the smart card CD1 does not have in memory templates of fingerprints of the cardholder but can analyze the minutiae present in each acquired object print PT1 and, from these minutiae, determine the fingerprints corresponding to the same finger and therefore to the same type.

Particularly, the smart card CD1 can verify that the object prints PT1 acquired at S4 in the sequence SQ1 are indeed fingerprints from a detection of the minutiae characterizing each print. On detection of minutiae characteristic of a finger, the smart card CD1 determines that an object print PT1 constitutes a fingerprint. As described below, the smart card CD1 can further compare the fingerprints PT1 of the sequence SQ1 to identify the prints corresponding to the same finger and therefore to the same print type (TY1 or TY2 in this example).

Still with reference to FIG. 5, the smart card CD1 also triggers a digital enrollment phase S10 including the steps S14 and S16 described below. As described below, variants are possible in which the enrollment phase S10 further includes an acquisition step S12.

By way of example, it is considered here that the smart card CD1 triggers the digital enrollment phase S10 in response to the determination at S8 that the authentication phase S2 is successful. The user UR being successfully authenticated, he is considered to be the cardholder and this enrollment phase S10 therefore allows performing a digital enrollment of the holder UR. It is thus possible to secure the process of digital enrollment of the user UR with the smart card CD1. As described later, variants are however possible in which the enrollment phase S10 is triggered before completion of the authentication phase S2, and therefore before the smart card CD1 determines at S8 that the authentication phase S2 is successful. The enrollment phase S10 can thus also be performed in parallel with (concomitantly with) the phase S2.

Thus, during a generation step S14, the smart card CD1 generates, from at least one fingerprint PT2, called enrollment fingerprint, digital enrollment data DREF2 it records (S16) so as to allow subsequent digital authentication from these digital enrollment data PT2. Such subsequent digital authentication will only be possible if the authentication result at S8 has passed successfully. As already indicated, the digital enrollment data DREF2 are recorded for example in the memory MR1 of the card.

It is assumed below by way of example that the smart card CD1 generates the digital enrollment data DREF2 from a plurality of enrollment fingerprints PT2. These enrollment prints PT2 can be obtained in various ways by the smart card CD1 as described below. The digital enrollment data DREF2 are for example generated by aggregating the enrollment fingerprints PT2 (or data characteristic of these prints). Various processing operations can be performed by the smart card CD1 to obtain the digital enrollment data DREF2 from the enrollment fingerprints PT2.

According to one particular example, at least one digital enrollment print PT2, from which the digital enrollment data DREF2 are generated at S14, is a fingerprint PT1 acquired at S4 from among the sequence SQ1 of object prints. In other words, the smart card CD1 uses, as an enrollment fingerprint PT2, at least one object print PT1 (more specifically a fingerprint) acquired at S4 during the authentication phase S2 to generate at S14 the digital enrollment data DREF2. It is thus possible to accelerate the digital enrollment process while ensuring a good level of security insofar as the same fingerprint acquired by the fingerprint sensor 8 can be used both to authenticate the user UR during of the authentication phase S2 and to enroll fingerprints of the user UR.

According to one particular example, each enrollment fingerprint PT2 used at S14 to generate the digital enrollment data DREF2 is a fingerprint PT1 of the sequence SQ1 of object prints acquired at S4 during the authentication phase S2. In this case, the generation S14 of the digital enrollment data DREF2 (and more generally the digital enrollment phase S10) can be triggered by the smart card CD1 before determining at S8 whether the authentication phase S2 is successful (that is to say before completion of the authentication phase S2). The authentication phase S10 can thus be executed in parallel with (concomitantly with) the authentication phase S2. Advantageously, the execution of the authentication phase S2 can be transparent for the user UR who then does not necessarily realize that the fingerprints he presents to the fingerprint sensor 8 both serve to authenticate and perform his digital enrollment with the card.

As indicated above, the enrollment fingerprints PT2 used during the enrollment phase S10 can be obtained at different stages of the method. According to one particular example, at least one of the enrollment fingerprints PT2, from which the digital enrollment data DREF2 are generated at S14, is a fingerprint PT2 acquired during an acquisition step S12 during the enrollment phase S10, independently of the acquisition S4 of the sequence SQ1. Thus, during the enrollment phase S10, the smart card CD1 can acquire S12, by the fingerprint sensor 8, as an enrollment fingerprint PT2, at least one fingerprint independently of the acquisition S4 of the sequence SQ1 of object prints PT1. In this way, the enrollment fingerprint(s) PT2 obtained during the acquisition S12 is used for the digital enrollment of the user UR during the enrollment phase S10 but does not serve to authenticate this user UR during of the authentication phase S2.

According to one particular example, the smart card CD1 uses, as an enrollment fingerprint PT2, at least one fingerprint PT1 acquired at S4 during the authentication phase S2 and further carries out the acquisition step S12 to acquire at least one additional enrollment fingerprint PT2 independently of the sequence SQ1 acquired at S4, to generate at S14 the digital enrollment data DREF2. It is for example possible to authenticate at S2 the user UR from a given number of fingerprints and to use, in addition to these fingerprints (or at least part of them), additional fingerprints acquired during the enrollment phase S10 to enroll the user UR.

According to one particular example, all the enrollment fingerprints PT2, from which the digital enrollment data DREF2 are generated at S14, are fingerprints PT2 acquired during the acquisition step S12 during the enrollment phase S10, independently of the acquisition S4 of the sequence SQ1. The enrollment phase S10 can then be performed in parallel or after the authentication phase S2. Particularly, the enrollment phase S10 can be initiated in response to the determination at S8 that the authentication phase S2 has passed successfully, as already indicated.

Once the enrollment phase S10 has been completed and if the authentication phase S2 has been determined at S8 (FIG. 5) as having passed successfully, the smart card CD1 has in memory digital enrollment data DREF2 that it can use as a print template during a subsequent authentication phase to verify the authenticity of a user UR. Thus, as represented in FIG. 5, the method can for example continue with a second authentication phase S18 subsequent to the authentication phase S2. During this authentication phase S18, the smart card CD1 acquires (S20) by the fingerprint sensor 8 at least one new fingerprint PT3 (a single or a plurality depending on the case) then performs an authentication (S22) from a comparison of the at least one new fingerprint PT3 with the digital enrollment data DREF2 recorded at S16 during the enrollment phase S10. Particularly, the smart card CD1 can determine at S22 whether the at least one new fingerprint PT3 is valid by comparing the at least one new fingerprint PT3 with the digital enrollment data DREF2. The at least one new fingerprint PT3 is then determined as valid if it coincides with (or conforms to) the digital enrollment data DREF2. In the case where a plurality of new fingerprints PT3 are acquired at S20, the authentication S22 can for example be considered to have passed successfully if all these new fingerprints PT3 (or at least a predetermined number of them) conform to the digital enrollment data DREF2, otherwise the authentication is considered to have failed.

As indicated above, variants are in particular possible in which the enrollment phase S10 is not initiated in response to the determination at S8 that the authentication phase S2 has passed successfully, but is initiated upstream of the determination S8, so as to be executed in parallel with the authentication phase S2. In this case, the smart card CD1 can therefore optionally execute the steps S12 and S14 to record the digital enrollment data DREF2 (all or part) even before the authentication phase S2 is completed, that is to say before determining at S8 the result of the authentication phase S2. Also, during the enrollment phase S10, the smart card CD1 can then carry out an erasing step (not represented) in response to the determination at S8 that the authentication phase S2 has failed. During this erasing step, the smart card CD1 erases (deletes) from its memory the digital enrollment data DREF2 previously recorded at S16, which allows securing the digital enrollment process in the event that the user UR could not be authenticated successfully.

Furthermore, According to one particular example, the reference sequence SQ0 as defined by the reference data DREF1 includes a plurality of object prints PT1 such that at least one object print PT1 of a first print type TY1 is interposed over time between at least two object prints PT1 of another print type TY2. The reference sequence SQ0 thus defines an alternation between several print types (at least two different print types), which allows securing the authentication of the user UR and therefore the digital enrollment process. Indeed, during a digital enrollment phase, it may seem more ergonomic and intuitive for a user UR to present the same first finger several times then to present several times another second finger without having to again acquire the first finger (which would amount to making acquisition "back-and-forth" operations between several fingers). This is explained by the fact that the purpose of a digital enrollment is not in theory to authenticate the user but to acquire his fingerprints so that they serve as print templates thereafter. However, it is possible thanks to the disclosure to complicate the acquisition of fingerprints PT1 during the authentication phase S2 by using a complex reference sequence SQ0 which requires acquisition back-and-forth operations between several different fingerprint types, these fingerprints being further able to serve at least partly to generate the digital enrollment data DREF2 during the enrollment phase S10. The digital enrollment is thus secure while limiting the number of fingerprints that must be acquired by the card.

Other variants of implementation of the embodiments described above in FIG. 5 are now described below with reference to FIGS. 6 and 7.

According to one particular example, it is considered that the smart card CD1 (FIGS. 1-3) carries out a processing method as represented in FIG. 5, in which the reference sequence SQ0 defined by the reference data DREF1 is the one represented in FIG. 4A. During the authentication phase S2, the smart card CD1 further carries out steps S30 and S32, and possibly also a step S34, as described below.

More specifically during an analysis step S30, the smart card CD1 analyzes each object print PT1 composing the sequence SQ1 acquired at S4 to determine whether the object print PT1 includes fingerprint minutiae. Particularly, the smart card CD1 determines whether minutiae characterizing a fingerprint (the surface of a finger) are present in each acquired object print PT1. In a known manner, any fingerprint by nature includes minutiae, namely characteristic points formed by a specific disposition of papillary lines. These minutiae characterize singular points or points of irregularity formed by the papillary lines (terminations, bifurcations, islands, etc.).

During an identification (or classification) step S32, the smart card CD1 identifies each object print PT1 of the sequence SQ1, either as a tool print corresponding to a first print type or as a fingerprint corresponding to at least one other print type, depending on whether the object print PT1 includes minutiae. By way of example, it is assumed here that the smart card CD1 classifies at S32 each object print PT1 of the sequence SQ1 acquired at S4, either as a fingerprint corresponding to a first print type TY1 or as a tool print corresponding to a second print type TY2, depending on whether the object print PT1 includes minutiae. It is however noted that variants are possible in which several different print types (note for example TY1a, TY1b, etc.) corresponding to fingerprints of different fingers can be defined in the reference sequence SQ0 in addition to a print type corresponding to a tool print.

During the identification step S32, the smart card CD1 therefore identifies the print type of each object print PT1 of the sequence SQ1 from the result of the analysis step S30. If the object print PT1 includes minutiae representative of the surface of a finger, the smart card CD1 determines that the print is a fingerprint denoted PT1a (of the type TY1). In the absence of such minutiae, the smart card CD1 determines that the considered object print PT1 is a tool print denoted PT1b (of the type TY2) representative of a tool (and not a finger).

Thus, during the comparison S6 performed in the authentication phase S2 (FIG. 5), the smart card CD1 compares the sequence SQ1 including fingerprints of the first and of the at least one other print type (namely prints according to the types TY1 and TY2 in this example) with the reference sequence SQ0 including prints of the first and of the at least one other print type (namely prints of the types TY1 and TY2 in this example).

According to one variant, the smart card CD1 further carries out during the authentication phase S2 a determination step S34 (FIG. 6) during which the card determines, from the result of the identification S32, a series SR1 of values (also called a classification code) representative of the sequence SQ1 of object prints acquired at S4. This series SR1 of values includes at least a first value V1 and a second value V2 different from the first value V1, so that each object print PT1 identified at S32 as a fingerprint PT1a is indicated by an occurrence of the first value V1 in the series SR1 of values and each object print PT1 identified at S32 as a tool print PT1b is indicated by an occurrence of the second value V2 in the series SR1 of values. In other words, the series SR1 includes for each object print PT1 a value representative of the type identified for the print, these values being ordered in accordance with the order in which the object prints PT1 were acquired at S4.

By way of example, V1=1 and V2=0 are chosen although other implementations are possible. It is thus possible to encode the type of each object print PT1 on one bit, the series SR1 of values including a succession of bits representative respectively of the type of each object print PT1 according to the order in which the object prints PT1 were acquired at S4. The values used as well as the number of values used to encode the series SR1 can be adapted depending on the case, in particular as a function of the number of different types of object prints provided in the reference sequence SQ0.

The smart card CD1 can for example temporarily record the object prints PT1 acquired during the acquisition S4 to perform the classification S32 and generate (S34) the series SR1. The classification S32, and possibly also the determination S34, can be performed dynamically as the object prints PT1 are acquired at S4, or possibly once the acquisition S4 is completed.

According to this variant, the smart card CD1 then performs the comparison S6 (FIG. 5) from the series SR1 of values obtained at S34. More particularly, the smart card CD1 compares (S6) the series SR1 of values with the reference data DREF1. To do so, the reference data can define, as a reference sequence SQ0, a sequence of values including the first and second values V1, V2. The reference data DREF1 can for example form a series of reference values equal to V1 or V2, this series being for example able to have the same format as that of the series SR1.

According to one particular example, it is considered that the smart card CD1 (FIGS. 1-3) carries out a processing method as represented in FIG. 5, in which the reference sequence SQ0 defined by the reference data DREF1 is the one represented in FIG. 4B. In the example considered here, during the authentication phase S2, the smart card CD1 performs an analysis step S40 and a comparison step S42 as represented in FIG. 7.

More specifically, during an analysis step S40, the smart card CD1 analyzes each object print PT1 of the sequence SQ1 of object prints acquired at S4 (FIG. 5) to identify minutiae (or fingerprint characteristics) in the fingerprints of the sequence SQ1. It is assumed by way of example that all the object prints PT1 are fingerprints PT1a produced by a corresponding finger detected by the fingerprint sensor 8 during the acquisition S4. If minutiae characteristic of a fingerprint cannot be identified at S40 in a given object print PT1, the smart card CD1 deduces therefrom that it is not a fingerprint or that it does not have a sufficient quality to be able to continue the method. In this case, the smart card CD1 may optionally require a new acquisition of the considered print or of all the prints of the sequence SQ1, or even terminate the method. Variants are however possible in which, among the object prints PT1 included in the sequence SQ1 acquired at S4, a plurality of them are fingerprints PT1a and at least one of them is a tool print PT1b. In this particular case, the smart card CD1 detects at S40 (FIG. 7) the object prints PT1 constituting fingerprints PT1a and processes these fingerprints by executing the comparison step S42 that follows from the fingerprints PT1a thus identified. The tool print(s) PT1b identified in the sequence SQ1 can also be processed as described above as belonging to a corresponding print type.

During the analysis S40, the smart card CD1 can carry out any appropriate processing on the fingerprints PT1a to identify characteristic points formed by the papillary lines of a finger. The smart card CD1 can for example determine, for each fingerprint PT1a, a model of minutiae representative of a finger of the user UR.

According to one particular example, the smart card CD1 temporarily records the object prints PT1 acquired during the acquisition S4 (for example in its RAM memory 4) so as to be able to carry out the analysis S40.

During a comparison step S42, the smart card CD1 compares the fingerprints PT1a of the sequence SQ1 from the minutiae identified at S40 so as to identify at least two different fingerprint types (denoted TY1 and TY2) corresponding to at least two different fingers. The smart card CD1 can thus distinguish, in the sequence SQ1, between different fingerprint types PT1a corresponding to different fingers, without however being able to verify that it is actually fingerprints of the considered user UR. This comparison step S42 therefore allows determining a respective print type for each of the fingerprints of the sequence SQ1. It is assumed in this example that the sequence SQ1 includes fingerprints PT1a according to two different print types TY1 and TY2, although other implementations are possible with a greater number of different print types (also possibly mixing tool prints PT1b conforming to another print type).

As already explained, the smart card CD1 does not have a reference template of the fingerprint of the user UR of the card since the phase of digital enrollment of this user UR has not yet taken place (as already indicated, the enrollment phase S10 may be optionally initiated before the result of the authentication phase S2 is obtained at S8, but the digital enrollment is not performed as long as this result has not been obtained). The smart card CD1 therefore compares the minutiae of the fingerprints PT1$a$ of the sequence SQ1 to determine which fingerprints correspond to the same finger and therefore to the same print type. To do so, the smart card CD1 applies for example an algorithm to assess a degree of resemblance, from their minutiae, of the fingerprints PT1$a$ of the sequence SQ1, so as to determine of which type (namely TY1 or TY2 in this example) is each of these fingerprints PT1$a$.

Thus, during the following comparison step S6 (FIG. 5), the print sequence SQ1 including the two different print types TY1, TY2 (or at least these two types TY1, TY2) is compared with the reference sequence SQ0 defined by the reference data DREF1. It is considered in this example that the reference sequence SQ0 includes prints according to two different print types TY1, TY2 corresponding to two different fingers (which can be arbitrary), although other implementations are possible in which the reference sequence SQ0 includes a greater number of different print types (also possibly mixing tool prints conforming to another print type).

According to one particular example, the smart card CD1 carries out the steps S44 and S46 (FIG. 7) during the comparison step S42. During the identification step S44, the smart card CD1 identifies a respective fingerprint PT1$a$ of the sequence SQ1, as a print template, for each among the at least two different fingerprint types (namely the two print types TY1 and TY2 in this example) if (or on detection that) the fingerprint corresponds to a finger detected for the first time in the sequence SQ1. It is meant by "finger detected for the first time" the first occurrence in the sequence SQ1 of a fingerprint PT1 corresponding to the considered finger.

By way of example, it is therefore considered here that the smart card CD1 detects at S44, in the sequence SQ1, a first fingerprint PT1$a\_1$ (and respectively a second fingerprint PT1$a\_2$ $b$) corresponding to a first finger (and respectively to a second finger different from the first finger) detected for the first time in the sequence SQ1 over time. The smart card CD1 then identifies the first fingerprint PT1$a\_1$ and the second fingerprint PT1$a\_2$ $b$ as print templates according to the first type TY1 (corresponding to the first finger) and the second type TY2 (corresponding to the second finger), respectively.

During the comparison step S46 (FIG. 7), the smart card CD1 thus compares each print template identified at S42 (namely the fingerprints PT1$a\_1$ and PT1$a\_2$ in this example) with the other fingerprints PT1$a$ of the sequence SQ1 acquired at S4 (FIG. 5) so as to identify each the other fingerprint as one among the at least two different fingerprint types. The disclosure thus allows reliably and efficiently distinguishing, within the sequence SQ1, different fingerprint types corresponding to different fingers, and this without the card having in memory at this stage a template of the fingerprint of the user, that is to say a fingerprint template as reference digital data.

The two steps S44 and S46 can optionally be carried out simultaneously (in parallel) during the comparison step S42. To do so, the smart card CD1 can successively analyze each fingerprint PT1$a$ occurring in the chronological order within the sequence SQ1 acquired at S4 (FIG. 5) and compare the print with one or several print template(s) already identified where appropriate during the identification step S44, to determine whether the print constitutes a template of a new fingerprint type corresponding to a new finger detected for the first time in the sequence SQ1 or to a fingerprint conforming to a previously identified print template in the sequence SQ1. In other words, the smart card CD1 recognizes, for example, each fingerprint PT1$a$, acquired over time during the acquisition period PR1 and which does not correspond to any existing fingerprint template, as a print template representative of a new print type. This processing is carried out for each fingerprint PT1$a$ acquired in accordance with the order in which the fingerprints were acquired at S4 in the sequence SQ1. The type of each fingerprint PT1$a$ forming the sequence SQ1 can thus be determined.

According to one variant, the smart card CD1 identifies at S44 (FIG. 7) at least a first fingerprint PT1$a\_1$ and a second fingerprint PT1$a\_2$, among the print sequence SQ1, as print templates of at least two different fingerprint types corresponding to at least two different fingers, and this according to a respective position of the at least a first and a second fingerprint PT1$a\_1$ and PT1$a\_2$ in the print sequence SQ1 acquired at S4. During the comparison step S46, the smart card CD1 can thus compare these first and second fingerprints PT1$a\_1$ and PT1$a\_2$ serving as print templates with the other fingerprints PT1$a$ of the print sequence SQ1 so as to identify each the other fingerprint PT1$a$ as one among the at least two different fingerprint types corresponding to at least two different fingers.

By way of example, the smart card CD1 can thus identify (S44) the first two fingerprints PT1$a$ acquired over time in the sequence SQ1, namely during a preliminary phase PR2 of the period PR1 (FIG. 4B), as fingerprint templates representative of the print types TY1 and TY2 respectively. The two first fingerprints beginning the sequence SQ1 then arbitrarily serve as templates with which each other fingerprint PT1$a$ of the sequence SQ1 is compared (S46) to determine its type among TY1 and TY2. The smart card CD1 assesses (S46) for example a degree of resemblance of each other fingerprint of the sequence SQ1 with respect to these two first fingerprints, the type of each other fingerprint being that of the print among these two first fingerprints to which it is the closest.

In general, the disclosure therefore allows performing a secure digital enrollment with a smart card including a fingerprint sensor, including when the smart card includes limited means in terms of user interface as is generally the case. Particularly, it is possible to use the fingerprint sensor of a smart card to authenticate a user even before (or in parallel to) the execution of a phase of digital enrollment of this user, and therefore without the smart card needing to have in memory a template of the fingerprint of the user in question. A user can simply and ergonomically make a particular sequence of object prints, by using one or several finger(s) and/or one or several tool(s). The authentication is passed successfully if the sequence thus acquired by the smart card matches with a reference sequence pre-recorded in the card. It is thus not necessary to make the smart card cooperate with a third-party terminal, such as a smartphone or the like, including an advanced user interface, which allows limiting the security risks linked to the digital enrollment process.

The disclosure allows taking advantage of the fingerprint sensor of a smart card to authenticate a user even before he has performed his digital enrollment. Particularly, the disclosure allows authenticating a user by using various objects, including tools other than fingers or any other anatomical parts. A user can securely authenticate himself with the smart card using a spoon or another everyday instrument, or even by using a dedicated tool (provided for example by the card issuer).

The disclosure particularly allows securing the use of a smart card, in particular of transactions processed by the card. Thus, once the digital enrollment has been successfully performed, the smart card can authenticate a user during the processing of a transaction. Depending on the result of a fingerprint verification performed by means of its fingerprint sensor, a smart card according to the disclosure can for example approve or deny a transaction, which allows limiting the risks of fraudulent use of the card.

Furthermore, as already indicated with reference to FIG. 5, the smart card CD1 can generate at S14 digital enrollment data DREF2 from one or several enrollment fingerprint(s) PT2 acquired during the acquisition step S12. Furthermore, to speed up the digital enrollment process while guaranteeing a good level of security, the smart card CD1 can use, as a replacement for or as a supplement to or in addition to the enrolment fingerprint(s) PT2 acquired at S10, at least one object print PT1 previously acquired at S4 during the authentication phase, the at least one print PT1 corresponding to a fingerprint. In other words, the smart card CD1 can also use one or several fingerprint(s) PT1 acquired during the authentication phase S2 to replace or supplement the enrollment fingerprints PT2 from which the digital enrollment data DREF2 are generated. The enrollment process is improved (accelerated and secured) insofar as the same fingerprint can be used both to authenticate a user UR during the authentication phase S2 and also to enroll this same user UR during the digital enrollment phase S10.

According to one particular exemplary embodiment, the reference sequence SQ0 as defined by the reference data DREF1 includes tool prints according to at least two different print types. In this case, the smart card CD1 is capable, during the authentication phase S2 (FIG. 5), of detecting and analyzing the tool prints TL1 included in the sequence SQ1 acquired at S4, so as to identify what print type is the tool print among at least two different print types corresponding to at least two different tools. To do so, the smart card CD1 can for example analyze characteristics specific to tool prints to distinguish at least two different tool types. Particularly, the smart card CD1 can for example compare the tool prints detected in the sequence SQ1 (similarly to the fingerprints) to identify a respective print template for each print type corresponding to each considered tool, and to identify the type to which each other tool print of the sequence SQ1 relates by an assessment of a degree of resemblance of each other tool print with each print template.

It should be noted that the user UR wishing to enroll with the smart card CD1 as previously described can be informed, by the issuer of the card (for example by a bank) or any other third party provided for this purpose, of the reference sequence SQ0 to be followed during the authentication phase S2. The communication of this reference sequence SQ0 can be done in any appropriate way, for example via any communication medium known to those skilled in the art other than that by which he received the card, for example by paper mail or by SMS sent to a communication terminal of the user UR.

As understood by those skilled in the art, the embodiments and variants described above only constitute non-limiting exemplary implementations of the disclosure. Particularly, those skilled in the art may consider any adaptation or combination of the embodiments and variants described above, in order to meet a very specific need in accordance with the claims presented below.

The invention claimed is:

1. A processing method implemented by a smart card comprising a fingerprint sensor, the method comprising:
    a) an authentication phase comprising:
        a1) acquiring a sequence of object prints from objects detected over time by the fingerprint sensor;
        a2) comparing the acquired sequence of object prints with reference data prerecorded in the smart card, said reference data defining a reference sequence of object prints according to at least two different print types; and
        a3) determining that the authentication phase is successful if the sequence of object prints coincides with the reference data;
    b) a digital enrollment phase comprising:
        b1) generating, from at least one fingerprint, called enrollment fingerprint, digital enrollment data; and
        b2) recording the digital enrollment data so as to allow subsequent digital authentication from said digital enrollment data.

2. The method according to claim 1, wherein, prior to the authentication phase, the method comprises:
    recording the reference data in a memory of the smart card.

3. The method according to claim 1, wherein the reference sequence to be followed during the acquisition phase comprises at least two print groups acquired sequentially over time, each print group comprising at least one object print acquired simultaneously by the fingerprint sensor.

4. The method according to claim 1, wherein during the enrollment phase b), the method comprises:
    b0) acquiring, by the fingerprint sensor, as an enrollment fingerprint, at least one fingerprint independently of the acquisition a1) of the sequence of object prints.

5. The method according to claim 1, wherein at least one said enrollment fingerprint, from which the digital enrollment data are generated at b1), is a fingerprint acquired at a1) from among the sequence of object prints.

6. The method according to claim 1, wherein the recording b2) is performed before the determination a3), the digital enrollment phase further comprising, following the recording b2):
    b3) erasing the digital enrollment data in response to the determination at a3) that the authentication phase has failed.

7. The method according to claim 1, wherein the enrollment b) phase is triggered in response to the determination at a3) that the authentication phase is successful.

8. The method according to claim 1, wherein according to the reference sequence, an object print of a first print type is interposed in time between two object prints of another print type.

9. The method according to claim 1, wherein each object detected by the fingerprint sensor at a1) is a finger or a tool.

10. The method according to claim 9, wherein the authentication phase comprises:
    analyzing each object print of the sequence of object prints acquired at a1) to determine whether said object print comprises minutiae;
    identifying each object print of the acquired sequence of object prints, either as a tool print corresponding to a first print type or as a fingerprint corresponding to at least one other print type, depending on whether said object print comprises minutiae;

wherein, during the comparison a2), the acquired sequence of object prints comprising prints of the first and of said at least one other print type is compared with the reference sequence comprising prints of the first and of said at least one other print type.

11. The method according to claim 10, wherein the authentication phase comprises:
   determining a series of values representative of the acquired sequence of object prints, in which each object print identified as a fingerprint is indicated in the series of values by an occurrence of a first value and each object print identified as a tool print is indicated in the series of values by an occurrence of a second value different from the first value; and
   wherein, during the comparison a2), the series of values representing the acquired sequence of object prints is compared with the reference data which define, as a reference sequence, a sequence of values comprising the first and second values.

12. The method according to claim 1, wherein the acquired sequence of object prints comprises fingerprints, the authentication phase comprising:
   analyzing each fingerprint of the sequence of object prints acquired at a1) to identify minutiae in the fingerprints of said acquired sequence of object prints;
   comparing the fingerprints of said sequence of object prints acquired from the identified minutiae so as to identify at least two different fingerprint types corresponding to at least two different fingers;
   wherein, during the comparison a2), the acquired sequence of object prints comprising said at least two different fingerprint types is compared with the reference sequence comprising fingerprints corresponding to at least two different fingers.

13. The method according to claim 12, wherein the authentication phase comprises:
   identifying a respective fingerprint of the acquired sequence of object prints, as a print template, for each among said at least two different fingerprint types if said fingerprint corresponds to a detected finger for the first time in the acquired sequence of object prints;
   each print template being compared with the other fingerprints of the sequence of object prints so as to identify each said other fingerprint as one among said at least two different fingerprint types.

14. A computer program including instructions for the execution of the steps of a processing method according to claim 1 when said program is executed by a computer.

15. A smart card comprising:
   a fingerprint sensor;
   an authentication module configured to:
      acquire a sequence of object prints from objects detected over time by the fingerprint sensor;
      compare the acquired sequence of object prints with reference data prerecorded in the smart card, said reference data defining a reference sequence of at least two different print types; and
      determine that the authentication phase is successful if the sequence of object prints coincides with the reference data;
   an enrollment module configured to:
      generate, from at least one fingerprint, called enrollment fingerprint, digital enrollment data; and
      record digital enrollment data so as to allow subsequent digital authentication from said digital enrollment data.

* * * * *